(12) United States Patent
Roytberg et al.

(10) Patent No.: US 6,283,689 B1
(45) Date of Patent: *Sep. 4, 2001

(54) INSERT FASTENER

(75) Inventors: Leonid Roytberg, Brookline; Howard N. Wieland, Holliston, both of MA (US)

(73) Assignee: American Engineered Components, Inc., Brighton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/542,604

(22) Filed: Apr. 4, 2000

Related U.S. Application Data

(63) Continuation-in-part of application No. 09/449,805, filed on Nov. 26, 1999, now Pat. No. 6,164,885.

(51) Int. Cl.⁷ .............................. F16B 13/06; F16B 37/04
(52) U.S. Cl. .............................. 411/61; 411/55; 411/60.2; 411/182; 411/508
(58) Field of Search .............................. 411/57.1, 60.2, 411/61, 182, 508, 913, 55

(56) References Cited

U.S. PATENT DOCUMENTS

| | | | |
|---|---|---|---|
| 2,208,779 | * 7/1940 | Tinnerman | 411/61 |
| 5,593,263 | 1/1997 | Clinch et al. | |
| 5,873,690 | 2/1999 | Danby et al. | |
| 5,919,019 | * 7/1999 | Fischer | 411/182 |

* cited by examiner

Primary Examiner—Neill Wilson
(74) Attorney, Agent, or Firm—Kriegsman & Kriegsman

(57) ABSTRACT

A one-piece insert fastener adapted for securement within an aperture in a panel by a threaded member. The insert fastener includes a base having a top surface, a bottom surface and a pair of outwardly protruding wings. In one embodiment, the base additionally includes a single-threaded, helical edge which is shaped to define an opening. In another embodiment, the base additionally includes an internally threaded drawn barrel which is shaped to define an opening. The insert fastener also includes a pair of resilient, spaced apart legs which are formed on and protrude out from the base. Each of the pair of legs includes an outwardly angled upper section, an inwardly angled middle section and a lower section. In use, the insert fastener is disposed into the aperture in the panel until the pair of wings abuts against the outer surface of the panel. The threaded member is rotatably driven into the opening in the base, the threaded member engaging the base upon rotation. Continued rotational driving of the threaded member causes the threaded member to contact and outwardly urge the pair of spaced apart legs into contacting engagement with the inner surface of the panel, thereby securing the insert fastener onto the panel. Insertion of the above fastener into a panel requires less than ten pounds of force. Once inserted, the fastener is secure until final assembly.

17 Claims, 5 Drawing Sheets

INSERT FASTENER

CROSS-REFERENCE TO RELATED APPLICATIONS

This application is a continuation-in-part of U.S. patent application Ser. No. 09/449,805, which was filed on Nov. 26, 1999 in the names of Leonid Roytberg and Howard N. Wieland now U.S. Pat. No. 6,164,885.

BACKGROUND OF THE INVENTION

The present invention relates generally to fasteners and more particularly to insert fasteners adapted for securement within an opening in a panel by a threaded member.

Insert fasteners are well known in the art and are commonly used in the automotive industry to secure objects, such as interior trim, stereos, stereo speakers and/or glove compartments, onto a panel, such as an automotive body door panel and/or a dash panel.

Insert fasteners are used to secure an object onto a panel in the following manner. Specifically, the insert fastener is typically pushed into a square-shaped opening which is punched, molded or formed in the panel, the panel typically being manufactured out of a soft sheet metal or plastic. With the insert fastener disposed within the opening in the panel, the object is positioned against the panel. A threaded member, such as a screw, is then driven through the object and into threaded engagement with the insert fastener, thereby securing the object onto the panel. In the automotive manufacturing process, the threaded member is commonly driven through the object and into the insert fastener using automatic screw driving devices which typically have torque levels that are set for larger threaded members (approximately 5 Newton-meters).

One type of insert fastener which is well known in the art is the snap-in insert fastener.

Snap-in insert fasteners, also commonly referred to as snap-in fasteners, typically comprise one or more resilient fingers which are adapted to flatten as the fingers are pressed into the aperture in the automotive panel. Once the fingers pass through the aperture and onto the opposite side of the panel, the fingers outwardly snap back to their original configuration to lockingly secure the fastener onto the automotive panel.

Snap-in fasteners of the type described above are often constructed out of a solid, molded plastic which includes a central bore therethrough. In use, self-threading screws are typically driven in the central bore and into threaded engagement with the fastener.

As an example of a snap-in fastener, in U.S. Pat. No. 5,593,263 to J. P. Clinch et al, there is disclosed a snap-in fastener that is adapted to having an object such as automobile trim secured thereto by a threaded member such as a screw. The snap-in fastener features a pair of opposed resilient fingers having a contoured cross-section which enable them to flatten as they are pressed into an aperture in a panel. The fingers flatten as they are pressed into the panel aperture until free-ends of tabs extending therefrom spring or snaps outwardly to engage the opposite side of the panel to lockingly secure the fastener and the trim to the panel while enabling the fingers to resume their original contoured cross-sectional configuration.

Although well known and widely used in commerce, snap-in insert fasteners experience some notable drawbacks.

As a first drawback, virtually all known snap-in fasteners are "one-way" fasteners. As a result, once inserted into a panel opening, snap-in fasteners are not removable without destroying the fastener or the panel.

As a second drawback, some types of snap-in insert fasteners require a high level of force in order to remove the fastener from the panel. Consequently, the snap-in insert fasteners are effectively incapable of being backed out of the opening in the panel without destroying the shape of the aperture in the panel or destroying the functionality of the fastener itself. Because the snap-in fasteners can not be backed out of the aperture in the panel, the fasteners are rendered incapable of reuse or replacement. This is particularly significant with regards to snap-in fasteners that are constructed of plastic. Specifically, it has been found that automatic screw driving guns, which are routinely used on the assembly lines of automobile manufacturers, drive the threaded member into the fastener at such a high torque (approximately 5 Newton-meters) that the plastic fastener can become stripped as the threaded member is driven through the central bore. As a result, the stripped plastic fastener is unable to hold the screw, thereby rendering the plastic fastener useless. Because the stripped plastic fastener is incapable of being backed out of the door panel, the fastener has to be knocked into and through the panel aperture in order to remove the stripped plastic fastener. By knocking the plastic fastener into the panel, the insert is irretrievably lost within the interior of the automotive panel. Positioned free within the interior of the automotive panel, the insert tends to bounce around and can rattle within the automobile, thereby creating unwanted noise.

As a third drawback, it has been found that the tight, snap-fit securement of snap-in insert fasteners within an associated opening in the automotive panel limits the range of potential applications in which the fastener can be used. In particular, the snap-fit mechanics of a snap-in insert fastener allows for the fastener to be used only in conjunction with automotive or other panels having apertures of limited sizes and in conjunction with automotive panels of limited thicknesses.

As a fourth drawback, it has been found that snap-in insert fasteners require a relatively high insertion force (approximately 10 pounds) in order to push the fastener into the opening in the automotive panel. As a result, the entire manufacturing process of securing the object onto the panel is rendered more difficult and time consuming.

Another type of insert fastener which is well known in the art is the expansion insert fastener.

Expansion insert fasteners, also commonly referred to as expansion fasteners, typically comprise a pair of resilient legs and a central bore which is adapted to receive a threaded member. With the expansion fastener pressed into an aperture in an automotive panel, the threaded member is driven into the bore of the expansion fastener until the threaded member spreads the pair of resilient legs apart and into engagement against the panel, thereby securing the fastener within the opening in the panel.

As an example of an expansion fastener, in U.S. Pat. No. 5,873,690 to M. R. Danby et al, there is disclosed a thread nut expansion fastener for securement within an opening to a panel by a threaded member. When the threaded member is rotationally advanced through a barrel nut, the threaded member causes the free-ends of resilient legs to move away from each other and engage and urge resilient fingers into contacting engagement with opposite sides of the opening with sufficient force to secure the fastener to the panel.

Although well known and widely used in commerce, expansion fasteners experience some notable drawbacks.

For example, it has been found that the complex bending arrangement of the legs of expansion fasteners renders the manufacturing of expansion fasteners a relatively complicated and expensive process.

Other types of fasteners which are well known in the art and are commonly used to secure an object onto a panel are mechanical clinch nut fasteners and mechanical weld nut fasteners.

Mechanical clinch nut fasteners typically comprise a metallic insert fastener which is disposed into an aperture formed in a soft metal automotive panel. With the fastener disposed within the aperture in the panel, a hydraulic machine is used to permanently clinch the metal of the insert fastener onto the metal of the automotive panel.

Mechanical weld nut fasteners typically comprise a metallic insert fastener which is disposed into an aperture formed in a soft metal automotive panel. With the fastener disposed within the aperture in the panel, a welding tool is used to permanently weld the metal of the insert fastener onto the metal of the automotive panel.

Although well known and widely used in commerce mechanical clinch nut fasteners and mechanical weld nut fasteners experience some notable drawbacks.

As a first drawback, mechanical clinch nut fasteners and mechanical weld nut fasteners are permanently affixed to its associated automotive panel and, accordingly, are incapable of replacement. Consequently, if the fastener were to become stripped, there would be no means for securing the object to the panel.

As a second drawback, mechanical clinch nut fasteners and mechanical weld nut fasteners require that an operator individually affix each fastener onto its associated panel using a clinching tool or a welding tool, respectively. As a consequence, utilization of mechanical clinch nut fasteners and mechanical weld nut fasteners is expensive and highly labor intensive.

SUMMARY OF THE INVENTION

It is an object of the present invention to provide a new and improved insert fastener.

It is another object of the present invention to provide an insert fastener which is adapted for securement within an aperture in a panel by a threaded member.

It is yet another object of the present invention to provide an insert fastener as described above which is adapted to securely engage a threaded member driven therethrough at a high torque level.

It is still another object of the present invention to provide an insert fastener as described above which can be inserted into the aperture in the panel using a relatively low insertion force.

It is another object of the present invention to provide an insert fastener as described above which can be backed out of the aperture of the panel using a relatively low removal force.

It is yet another object of the present invention to provide an insert fastener as described above which can be easily reused and/or replaced.

It is still another object of the present invention to provide an insert fastener as described above which can be used in a wide range of applications, such as in apertures of varying length and width and in panels of varying thickness.

It is another object of the present invention to provide an insert fastener as described above which can be securely retained in a tight relationship within the aperture in the panel.

It is yet another object of the present invention to provide an insert fastener as described above which has a limited number of parts, which is easy to use and which is inexpensive to manufacture.

Accordingly, there is provided an insert fastener adapted for securement within an aperture in a panel by a threaded member, said insert fastener comprising a base having a top surface, a bottom surface, at least one wing and an opening which is sized and shaped to receive the threaded member, said base being adapted to engage the threaded member, and a pair of legs for securing said insert fastener onto the panel, said legs being formed on and protruding out from said base, each of said legs comprising an upper section and a middle section angled relative to the upper section about a first bend, wherein said legs are adapted to contact the threaded member in such a manner so that the threaded member outwardly urges said legs into contacting engagement with the panel.

Various other features and advantages will appear from the description to follow. In the description, reference is made to the accompanying drawings which form a part thereof, and in which is shown by way of illustration, various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 1:
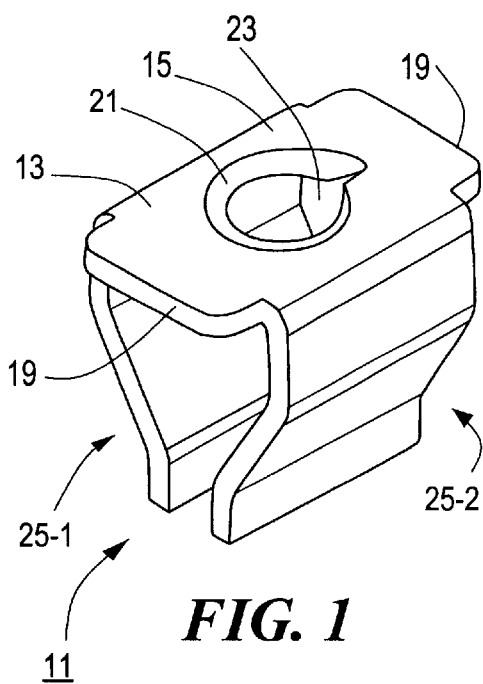
FIG. 1 is a top perspective view of a first embodiment of an insert fastener constructed according to the teachings of the present invention.
Figure 3:
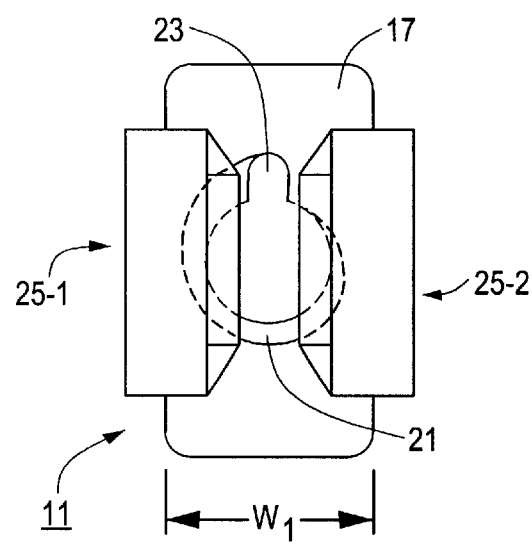
FIG. 3 is a bottom view of the insert fastener shown in FIG. 1.
Figure 2:
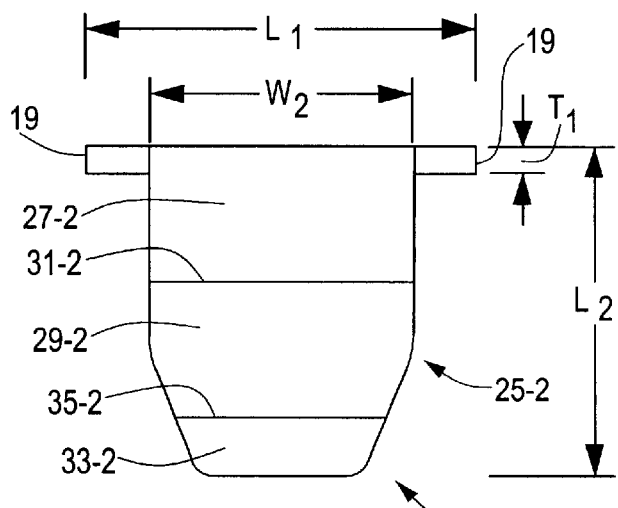
FIG. 2 is a side view of the insert fastener shown in FIG. 1.

Referring now to FIGS. 1–5, there is shown a first embodiment of an insert fastener constructed in accordance with the principles of the present invention, the insert fastener being identified by reference numeral 11. As will be described further in detail below, insert fastener 11 can be used to secure an object O onto a panel P using an externally threaded member, such as a screw S.

Figure 4:
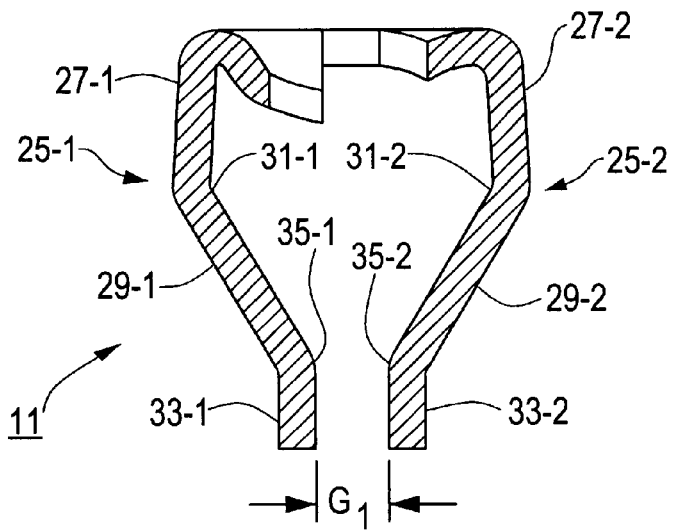
FIG. 4 is central cross-section view of the insert fastener shown in FIG. 1.

Insert fastener 11 is a unitary device which is preferably constructed out of a resilient and durable material, such as a high carbon, heat-treated spring steel. Insert fastener 11 is generally U-shaped in lateral cross-section, as shown in FIG. 4, and is capable of easy insertion into and removal from an aperture A in panel P, as will be described in further detail below.

Insert fastener 11 comprises a base 13 having a top surface 15, a bottom surface 17 and a pair of outwardly protruding wings 19. Base 13 preferably has a length $L_1$ of approximately 10.00 mm, a width $W_1$ of approximately 5.20 mm and a thickness $T_1$ of approximately 0.71 mm.

Base 13 additionally comprises a single-threaded, helical edge 21 which is shaped to define a central opening 23. Helical edge 21 is preferably approximately 4.2 mm in diameter and approximately 1.4 mm in pitch and is adapted to engage an associated 4.2×1.41 metric self-tapping screw S which is threadingly disposed through opening 23 during use.

Although insert fastener 11 is shown comprising single-threaded, helical edge 21, insert fastener 11 could alternatively be manufactured to comprise a multi-threaded barrel nut, or other types of similar threaded engagement means, without departing from the spirit of the present invention. However, it should be noted that single-threaded helical edge 21 is preferable because edge 21 is considerably easier to manufacture and requires less material than a multi-threaded barrel nut.

Insert fastener 11 further comprises first and second legs 25-1 and 25-2 which are formed on and protrude out from base 13 in a spaced apart relationship, as shown in FIG. 4. Legs 25 are one-piece members which are integrally formed onto base 13 to make insert fastener 11 a unitary device. Each leg 25 preferably has a length $L_2$ of approximately 8.64 mm and a width $W_2$ of approximately 6.81 mm. As will be described further in detail below, legs 25 serve to secure insert fastener 11 onto panel P.

First leg 25-1 comprises an upper section 27-1 which is integrally formed onto base 13. Similarly, second leg 25-2 comprises an upper section 27-2 which is integrally formed onto base 13. Upper sections 27-1 and 27-2 project out from base 13 at a prescribed angle away from bottom surface 17 so as to protrude outwardly away from each other. As will be described further in detail below, upper sections 27 serve as the contact and engagement surface for securing insert fastener 11 onto panel P.

First leg 25-1 also comprises a middle section 29-1 which is integrally formed onto upper section 27-1, middle section 29-1 being angled relative to upper section 27-1 about a first bend 31-1. Similarly, second leg 25-2 also comprises a middle section 29-2 which is integrally formed onto upper section 27-2, middle section 29-2 being angled relative to upper section 27-2 about a first bend 31-2. First bends 31-1 and 31-2 serve to project middle sections 29-1 and 29-2, respectively, inwardly towards each other.

First leg 25-1 further comprises a lower section 33-1 which is integrally formed onto middle section 29-1, lower section 33-1 being angled relative to middle section 29-1 about a second bend 35-1. Similarly, second leg 25-2 further comprises a lower section 33-2 which is integrally formed onto middle section 29-2, lower section 33-2 being angled relative to middle section 29-2 about a second bend 35-2. Second bends 35-1 and 35-2 serve to project lower sections 33-1 and 33-2, respectively, in a substantially parallel relationship with lower sections 33-1 and 33-2 spaced apart a gap setting $G_1$.

In use, insert fastener 11 can be used in the following manner to secure an object O, such as trim, onto a panel P, such as vehicular body panel, using an externally threaded member, such as screw S. Insert fastener 11 is pushed into an aperture A which is pre-formed in de-bossed, vehicular body panel P during typical automotive manufacturing. Insert fastener 11 is disposed into aperture A until outwardly protruding wings 19 abut against the outer surface of panel P. As such, wings 19 effectively prevent fastener 11 from being pushed all the way through aperture A.

It should be noted that the capability of legs 25 to be compressed considerably inward and the narrow lead-in configuration of lower sections 33 enable insert fastener 11 to be disposed within apertures of varying sizes, which is highly desirable. It should also be noted that the capability of legs 25 to be compressed considerably inward and the narrow lead-in configuration of lower sections 33 also enable insert fastener 11 to be snap-fit within aperture A using a relatively low insertion force, which is also highly desirable. In addition, it should further be noted that capability of legs 25 to be compressed considerably inward and the narrow lead-in configuration of lower sections 33 further enable insert fastener 11 to be backed out of aperture A using a relatively low removal force. As a result, fastener 11 is capable of replacement and/or reuse, which is highly desirable.

With insert fastener 11 disposed within aperture A, the outwardly angled disposition of upper sections 27 of legs 25 sufficiently contacts the inner surface of panel P to prevent inadvertent or casual removal of fastener 11 within aperture A. It should be noted that the length and angle of upper sections 27 enable fastener 11 to be disposed within panels P having varying thicknesses and/or burrs.

With insert fastener 11 properly disposed within aperture A, object O is positioned flush against panel P. Screw S is then driven through object O and into threaded engagement with single-threaded helical edge 21 of fasteners 11. It should be noted that the configuration of helical edge 21 enables insert fastener 11 to adequately engage screw S to prevent easy withdrawal of screw S from fastener 11. It should also be noted that the particular configuration and construction of helical edge 21 enables fastener 11 to properly engage a screw S driven thereinto at relatively high torque levels (approximately 5 Newton-meters) without stripping fastener 11, which is highly desirable.

Figure 5:
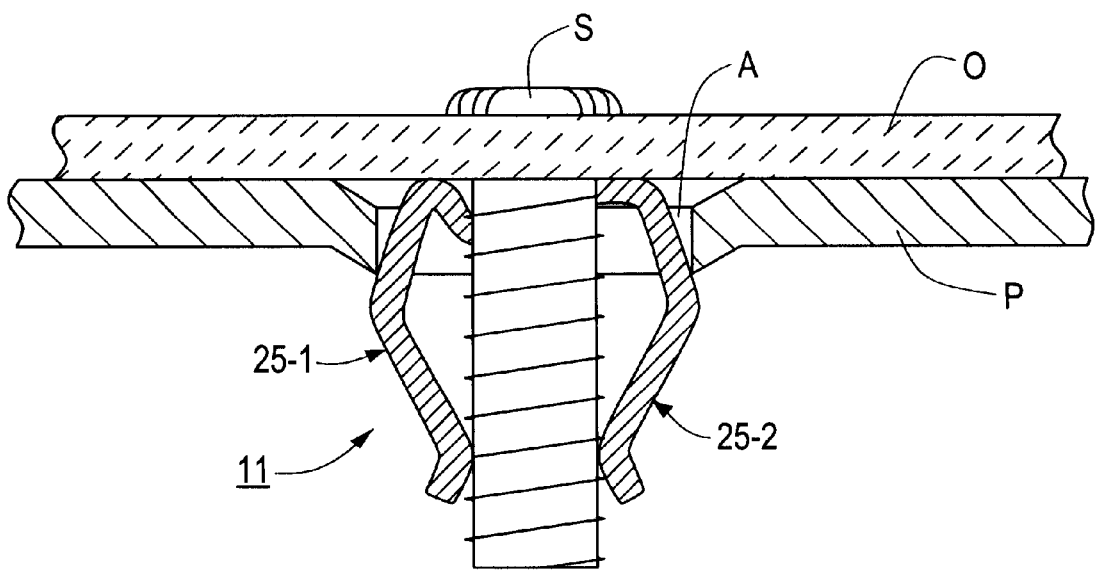
FIG. 5 is a central cross-section view of the insert fastener shown in FIG. 1, the insert fastener being shown securing an object to a panel by a threaded member, the threaded member being shown in plan view.
Figure 6:
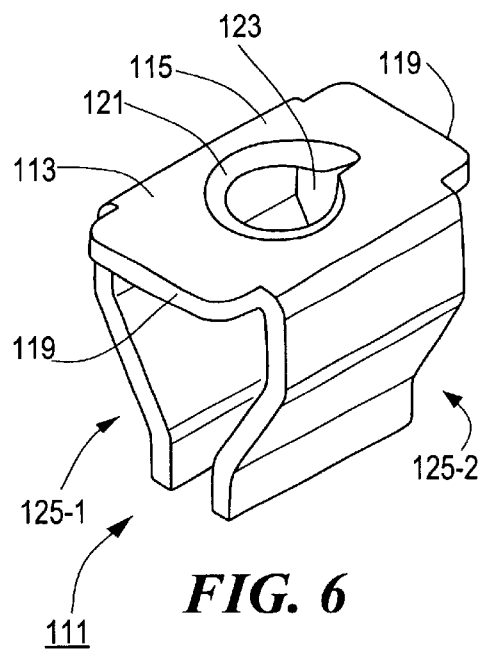
FIG. 6 is a top perspective view of a second embodiment of an insert fastener constructed a according to the teachings of the present invention.
Figure 8:
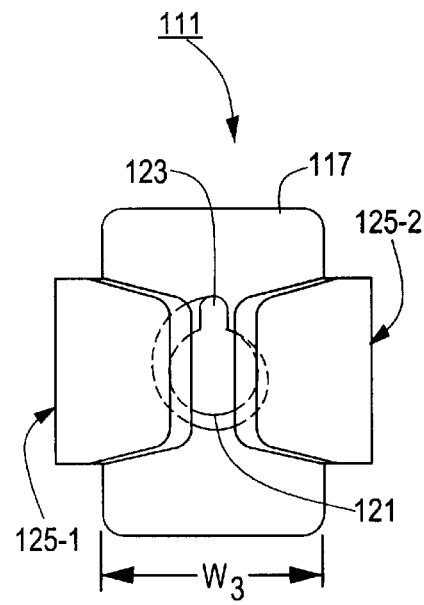
FIG. 8 is a bottom view of the insert fastener shown in FIG. 6.
Figure 7:
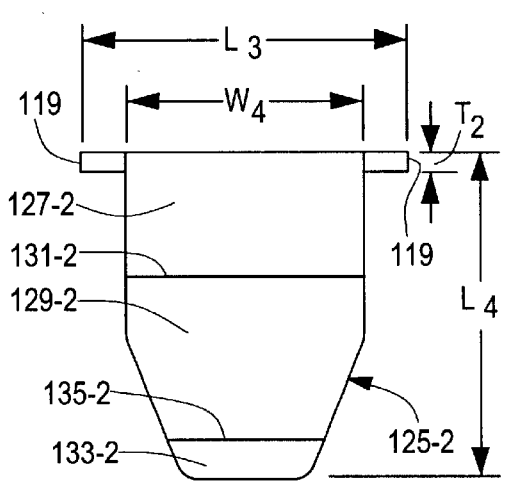
FIG. 7 is a side view of the insert fastener shown in FIG. 6.

Rotationally driving screw S into threaded engagement with helical edge 21 ultimately causes screw S to contact legs 25 proximate second bend 35, as shown in FIG. 5. It should be noted that the narrowly-spaced disposition of lower sections 33 serves to guide screw S straight down between legs 25. Continued rotation of screw S into fastener 11 causes screw 11 to outwardly urge legs 25 in such a manner that upper legs 27 are drawn into contacting engagement with panel P, thereby tightly securing insert fastener 11 and object O onto panel P.

It should be noted that insert fastener 11 is sized and shaped to be disposed within an aperture which is square shaped in configuration and which preferably has a length of approximately 7 mm and a width of approximately 7 mm. As such, the principal desired application for insert fastener 11 is to secure automotive trim onto an automotive body panel.

However, it should be noted that the present invention is not limited to the size and shape of insert fastener 11. Rather, it should be noted that insert fastener 11 could be enlarged or reduced to expand its range of potential applications. Specifically, referring now to FIGS. 6–9, there is shown a second embodiment of an insert fastener constructed in accordance with the principles of the present invention, the insert fastener being identified by reference numeral 111. As will be described further in detail below, insert fastener 111 is slightly larger than insert fastener 11 so that insert fastener 111 can be used in conjunction with additional applications.

Figure 9:
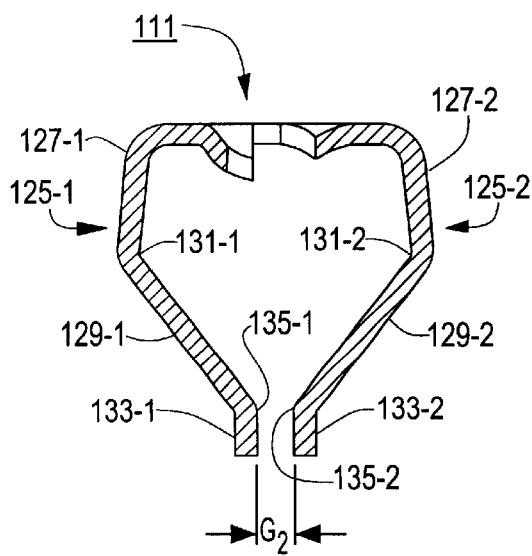
FIG. 9 is a central cross-section view of the insert fastener shown in FIG. 6.
Figure 10:
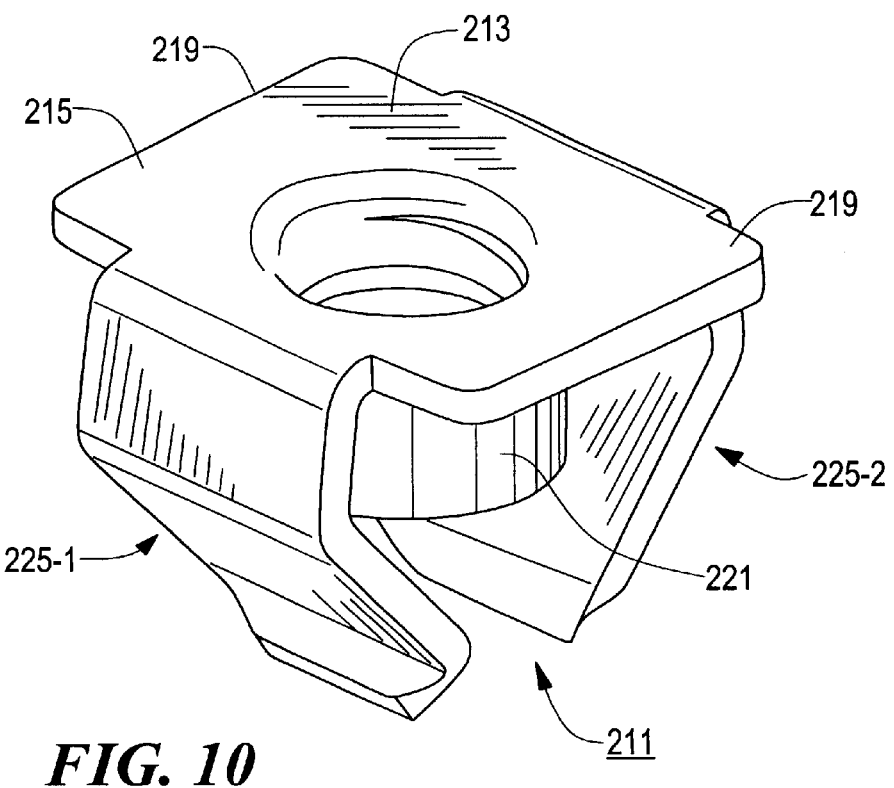
FIG. 10 is a top perspective view of a third embodiment of an insert fastener constructed according to the teachings of the present invention.

Insert fastener 111 is a unitary device which is preferably constructed out of a resilient and durable material, such as a high carbon steel or a heat-treated spring steel. Insert fastener 111 is generally U-shaped in lateral cross-section, as shown in FIG. 9, and is capable of easy insertion into and removal from an aperture in a panel P.

Insert fastener 111 is similar in construction and function with insert fastener 11, insert fastener 111 comprising a base 113 having a top surface 115, a bottom surface 117 and a pair of outwardly protruding wings 119. Base 113 preferably has a length $L_3$ of approximately 11.9 mm, a width $W_3$ of approximately 7.9 mm and a thickness $T_2$ of approximately 0.71 mm.

Base 113 additionally comprises a single-threaded, helical edge 121 which is shaped to define a central opening 123. Helical edge 121 is preferably approximately 4.2 mm in diameter and approximately 1.4 mm in pitch and is adapted to engage an associated 4.2×1.41 metric self-tapping screw which is threadingly disposed through opening 123 during use.

Although insert fastener 111 is shown comprising single-threaded, helical edge 121, insert fastener 111 could alternatively be manufactured to comprise a multi-threaded barrel nut, or other types of similar threaded engagement means, without departing from the spirit of the present invention. However, it should be noted that single-threaded helical edge 121 is preferable because edge 121 is considerably easier to manufacture and requires less material than a multi-threaded barrel nut.

Insert fastener 111 further comprises first and second legs 125-1 and 125-2 which are formed on and protrude out from base 113 in a spaced apart relationship, as shown in FIG. 9. Legs 125 are one-piece members which are integrally formed onto base 113 to make insert fastener 111 a unitary device. Each leg 125 preferably has a length $L_4$ of approximately 12.0 mm and a width $W_4$ of approximately 8.75 mm. As can be appreciated, legs 125 serve to secure insert fastener 111 onto an associated panel.

First leg 125-1 comprises an upper section 127-1 which is integrally formed onto base 113. Similarly, second leg 125-2 comprises an upper section 127-2 which is integrally formed onto base 113. Upper sections 127-1 and 127-2 project out from base 113 at a prescribed angle away from bottom surface 117 so as to protrude outwardly away from each other. As can be appreciated, upper sections 127 serve as the contact and engagement surface for securing insert fastener 111 onto its associated panel.

First leg 125-1 also comprises a middle section 129-1 which is integrally formed onto upper section 127-1, middle section 129-1 being angled relative to upper section 127-1 about a first bend 131-1. Similarly, second leg 125-2 also comprises a middle section 129-2 which is integrally formed onto upper section 127-2, middle section 129-2 being angled relative to upper section 127-2 about a first bend 131-2. First bends 131-1 and 131-2 serve to project middle sections 129-1 and 129-2, respectively, inwardly towards each other.

First leg 125-1 further comprises a lower section 133-1 which is integrally formed onto middle section 129-1, lower section 133-1 being angled relative to middle section 129-1 about a second bend 135-1. Similarly, second leg 125-2 further comprises a lower section 133-2 which is integrally formed onto middle section 129-2, lower section 133-2 being angled relative to middle section 129-2 about a second bend 135-2. Second bends 135-1 and 135-2 serve to project lower sections 133-1 and 133-2, respectively, in a substantially parallel relationship with lower sections 133-1 and 133-2 spaced apart a gap setting $G_2$.

As noted above, insert fastener 111 functions similarly to insert fastener 11 in securing an object onto a panel using an externally threaded member, such as a screw. However, it should be noted that insert fastener 111 is sized and shaped to be disposed within a relatively larger aperture than insert fastener 11. In particular, insert fastener 111 is sized and shaped to be disposed within an aperture which is rectangular shaped in configuration and which preferably has a length of approximately 11 mm and a width of approximately 9 mm. As such, the principal desired applications for insert fastener 111 is to secure larger automotive objects, such as a radio, glovebox or speaker, onto a panel, such as a door panel or a dash panel.

As noted above, fasteners 11 and 111 are not limited to comprising a single-threaded, helical edge for engaging the threaded member. Rather, fasteners 11 and 111 could comprise alternative means for engaging the threaded member without departing from the spirit of the present invention. Specifically, referring now to FIGS. 10–14, there is shown a third embodiment of an insert fastener constructed in accordance with the principles of the present invention, the insert fastener being identified by reference numeral 211. As will be described further in detail below, insert fastener 211 differs from insert fasteners 11 and 111 in that insert fastener 211 is a barrel-type insert fastener which can be used in heavy duty applications.

Insert fastener 211 is a unitary device which is preferably constructed out of a resilient and durable material, such as a high carbon steel or a heat-treated spring steel. Insert fastener 211 is capable of easy insertion into and removal from an aperture in a panel.

Insert fastener 211 is similar in construction and function with insert fasteners 11 and 111, insert fastener 211 comprising a base 213 having a top surface 215, a bottom surface 217 and a pair of outwardly protruding wings 219. Base 213 preferably has a length $L_5$ of approximately 0.875 inches and a width $W_5$ of approximately 0.625 inches.

Base 213 additionally comprises a drawn barrel 221 having an interior surface 222 which is shaped to define a central opening 223. Drawn barrel 221 has a length $L_6$ of approximately 0.375 inches and includes a plurality of threadings 224 which are adapted to engage an associated screw which is threadingly disposed through opening 223 during use.

Figure 11:
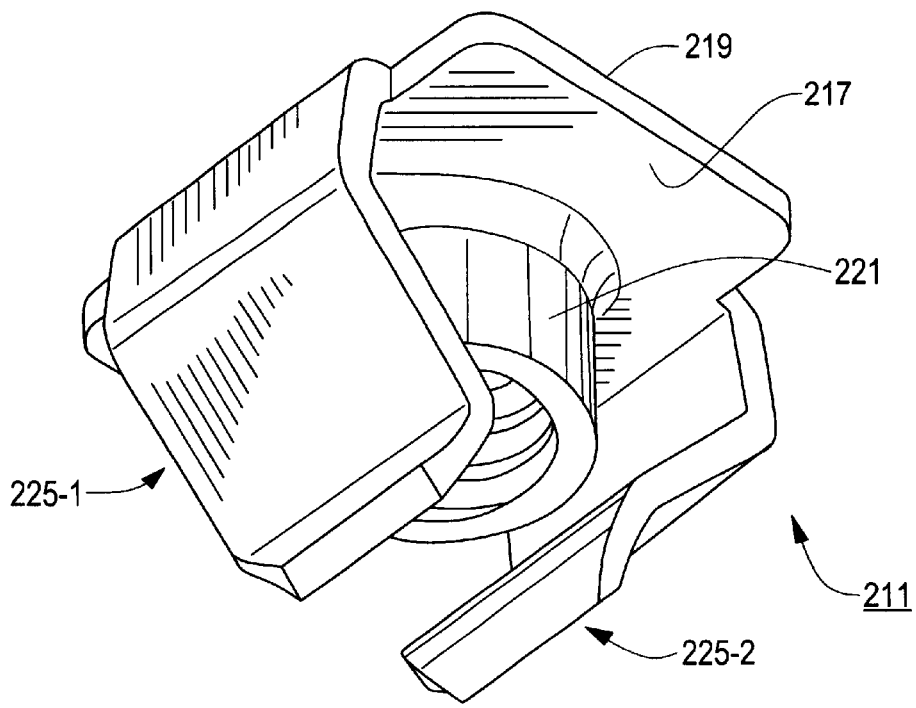
FIG. 11 is a bottom perspective view of the insert fastener shown in FIG. 10.
Figure 12:
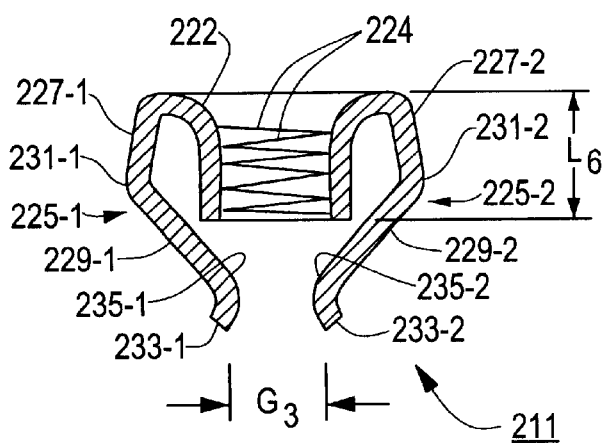
FIG. 12 is a central cross-section view of the insert fastener shown in FIG. 10.
Figure 13:
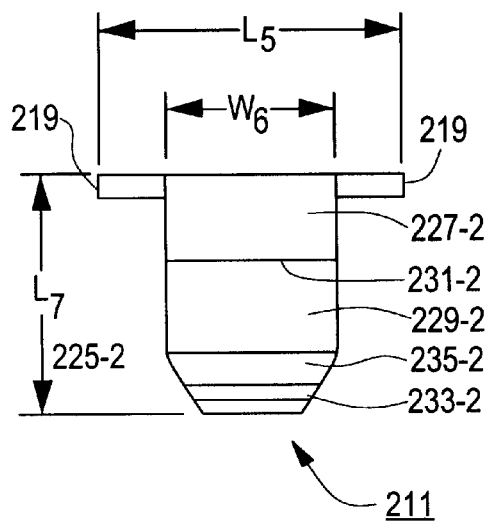
FIG. 13 is a side view of the insert fastener shown in FIG. 10.
Figure 14:
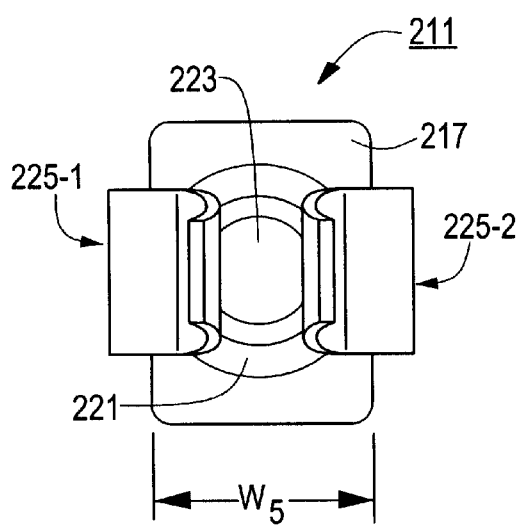
FIG. 14 is a bottom view of the insert fastener shown in FIG. 10.

Insert fastener 211 further comprises first and second legs 225-1 and 225-2 which are formed on and protrude out from base 213 in a spaced apart relationship, as shown in FIGS. 11 and 12. Legs 225 are one-piece members which are integrally formed onto base 213 to make insert fastener 211 a unitary device. Each leg 225 preferably has a length $L_7$ of approximately 0.698 inches and a width $W_6$ of approximately 0.484 inches. As can be appreciated, legs 225 serve to secure insert fastener 211 onto an associated panel.

First leg 225-1 comprises an upper section 227-1 which is integrally formed onto base 213. Similarly, second leg 225-2 comprises an upper section 227-2 which is integrally formed onto base 213. Upper sections 227-1 and 227-2 project out from base 213 at a prescribed angle away from bottom surface 217 so as to protrude outwardly away from each other. As can be appreciated, upper sections 227 serve as the contact and engagement surface for securing insert fastener 211 onto its associated panel.

First leg 225-1 also comprises a middle section 229-1 which is integrally formed onto upper section 227-1, middle section 229-1 being angled relative to upper section 227-1 about a first bend 231-1. Similarly, second leg 225-2 also comprises a middle section 229-2 which is integrally formed onto upper section 227-2, middle section 229-2 being angled relative to upper section 227-2 about a first bend 231-2. First bends 231-1 and 231-2 serve to project middle sections 229-1 and 229-2, respectively, inwardly towards each other.

First leg 225-1 further comprises a lower section 233-1 which is integrally formed onto middle section 229-1, lower section 233-1 being angled relative to middle section 229-1 about a second bend 235-1. Similarly, second leg 225-2 further comprises a lower section 233-2 which is integrally formed onto middle section 229-2, lower section 233-2 being angled relative to middle section 229-2 about a second bend 235-2. Second bends 235-1 and 235-2 serve to project lower sections 233-1 and 233-2, respectively, in a substantially parallel relationship with lower sections 233-1 and 233-2 spaced apart a gap setting $G_3$.

Figure 15:
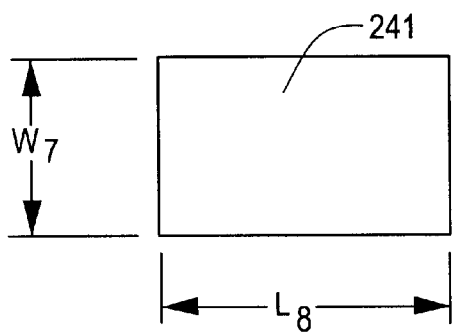
FIG. 15 is a top plan view of an opening which is sized and shaped to accept the insert fastener shown in FIG. 10.

As noted above, insert fastener 211 functions similarly to insert fasteners 11 and 111 in securing an object onto a panel using an externally threaded member, such as a screw. However, it should be noted that insert fastener 211 is sized and shaped to be disposed within a relatively larger aperture than insert fasteners 11 and 111. In particular, insert fastener 211 is sized and shaped to be disposed within an aperture 241 which is generally rectangular and which preferably has a length $L_8$ of approximately 0.826 inches and a width $W_7$ of approximately 0.5 inches, as shown in FIG. 15. Furthermore, due to the multiple internal threading configuration of drawn barrel 221, insert fastener 211 is can be used in heavier duty applications than insert fasteners 11 and 111.

The embodiments shown of the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. An insert fastener adapted for securement within an aperture in a panel by a threaded member, said insert fastener comprising:

(a). a base having a top surface, a bottom surface, at least one wing and an opening which is sized and shaped to receive the threaded member, said base being adapted to engage the threaded member, and (b). a pair of legs for securing said insert fastener onto the panel, said legs being formed on and protruding out from said base, each of said legs comprising an upper section and a middle section angled relative to the upper section about a first bend, (c). wherein said legs are adapted to contact the threaded member in such a manner so that the threaded member outwardly urges said legs into contacting engagement with the panel.

2. The insert fastener of claim 1 wherein said insert fastener is a unitary device.

3. The insert fastener of claim 2 wherein the upper sections of said pair of legs are angled outwardly away from each other.

4. The insert fastener of claim 3 wherein the middle sections of said pair of legs are angled inwardly towards each other.

5. The insert fastener of claim 4 wherein the lower sections of said pair of spaced apart legs are disposed in a substantially parallel relationship.

6. An insert fastener adapted for securement within an aperture in a panel by a threaded member, said insert fastener comprising:

(a). a base having a top surface, a bottom surface, a pair of wings and a helical edge shaped to define an opening, the opening being sized and shaped to receive the threaded member and the helical edge being adapted to engage the threaded member, and (b). a pair of spaced apart legs for securing said insert fastener onto the panel, said legs being formed on and protruding out from said base, each of said legs comprising an upper section, a middle section angled relative to the upper section about a first bend and a lower section angled relative to the middle section about a second bend, (c). wherein said legs are adapted to contact the threaded member in such a manner so that the threaded member outwardly urges said legs into contacting engagement with the panel.

7. The insert fastener of claim 6 wherein said insert fastener is a unitary device.

8. The insert fastener of claim 7 wherein the upper sections of said pair of spaced apart legs are angled outwardly away from each other.

9. The insert fastener of claim 8 wherein the middle sections of said pair of spaced apart legs are angled inwardly towards each other.

10. The insert fastener of claim 9 wherein the lower sections of said pair of spaced apart legs are disposed in a substantially parallel relationship.

11. The insert fastener of claim 10 wherein the helical edge in said base is single threaded.

12. An insert fastener adapted for securement within an aperture in a panel by a threaded member, said insert fastener comprising:

(a). a base having a top surface, a bottom surface, a pair of wings and a drawn barrel shaped to define an opening, the opening being sized and shaped to receive the threaded member, the drawn barrel being adapted to engage the threaded member, and (b). a pair of spaced apart legs for securing said insert fastener onto the panel, said legs being formed on and protruding out from said base, each of said legs comprising an upper section, a middle section angled relative to the upper section about a first bend and a lower section angled relative to the middle section about a second bend, (c). wherein said legs are adapted to contact the threaded member in such a manner so that the threaded member outwardly urges said legs into contacting engagement with the panel.

13. The insert fastener of claim 12 wherein said insert fastener is a unitary device.

14. The insert fastener of claim 13 wherein the upper sections of said pair of spaced apart legs are angled outwardly away from each other.

15. The insert fastener of claim 14 wherein the middle sections of said pair of spaced apart legs are angled inwardly towards each other.

16. The insert fastener of claim 15 wherein the lower sections of said pair of spaced apart legs are disposed in a substantially parallel relationship.

17. The insert fastener of claim 16 wherein the drawn barrel comprises an interior surface which includes a plurality of threadings which are adapted to engage the threaded member.

* * * * *